March 24, 1959 S. W. SMITH ET AL 2,879,014
JET PROPELLED AIRPLANE WITH JET DIVERTER
Filed July 2, 1957 5 Sheets-Sheet 1
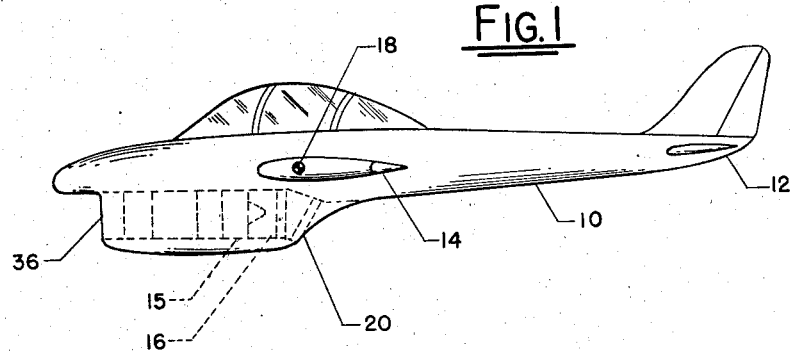
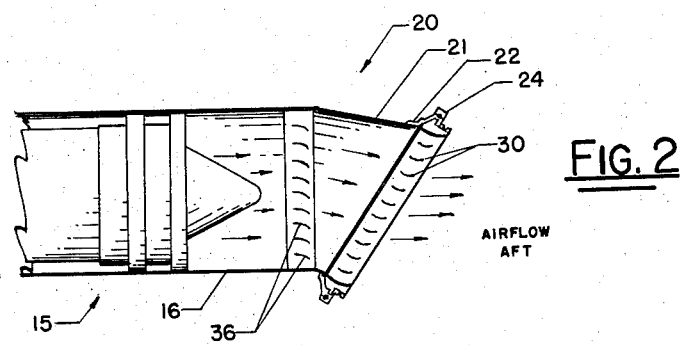
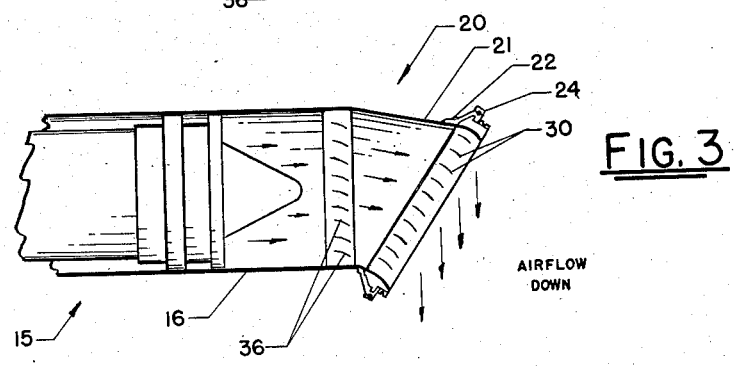
INVENTORS
STANLEY W. SMITH
CHARLES M. SPERAZZ SR.
BY
*Beau, Brooks, Buckley + Beau.*
ATTORNEYS March 24, 1959 S. W. SMITH ET AL 2,879,014
JET PROPELLED AIRPLANE WITH JET DIVERTER
Filed July 2, 1957 5 Sheets-Sheet 2

INVENTORS
STANLEY W. SMITH
CHARLES M. SPERAZZ SR
BY
Bean, Brooks, Buckley & Bean.
ATTORNEYS March 24, 1959  S. W. SMITH ET AL  2,879,014
JET PROPELLED AIRPLANE WITH JET DIVERTER
Filed July 2, 1957  5 Sheets-Sheet 4

INVENTORS
STANLEY W. SMITH
BY CHARLES M. SPERAZZ, JR.

Beau, Brooks, Buckley + Beau.
ATTORNEYS

United States Patent Office 2,879,014
Patented Mar. 24, 1959

2,879,014

JET PROPELLED AIRPLANE WITH JET DIVERTER

Stanley W. Smith, Lyndonville, and Charles M. Sperazz, Sr., Williamsville, N.Y., assignors to Bell Aircraft Corporation, Wheatfield, N.Y.

Application July 2, 1957, Serial No. 669,643

6 Claims. (Cl. 244—12)

This invention relates to jet engine type aircraft, and more particularly to an improved type fixed wing aircraft suited to vertical takeoff and landing maneuvering, while deriving power from a positionally fixed jet type power plant.

The invention is featured by provision of a jet type power plant fixedly mounted in a novel positional arrangement in a fixed wing aircraft, in combination with a novel engine thrust direction diverting mechanism, whereby alternate vertical and horizontal and intermediate flight maneuvering of the aircraft may be obtained with improved efficiency. Generally stated, the invention contemplates location of a suitable jet type power plant at a low center of gravity position in a fixed wing aircraft with the net thrust discharge of the power plant located approximately beneath the overall center of gravity of the aircraft, in combination with a novel mechanism for diverting the engine thrust discharges between vertical and horizontal directions. Thus, the invention may comprise for example mechanisms as shown in the accompanying drawings wherein:

Fig. 1 is a side elevational view of one form of aircraft embodying the invention;

Figs. 2 and 3 are fragmentary longitudinal sectional views through the discharge end of one of the aircraft engine tail pipes and thrust diverter mechanisms, showing the latter in horizontal and vertical thrust positions, respectively;

Figure 4:
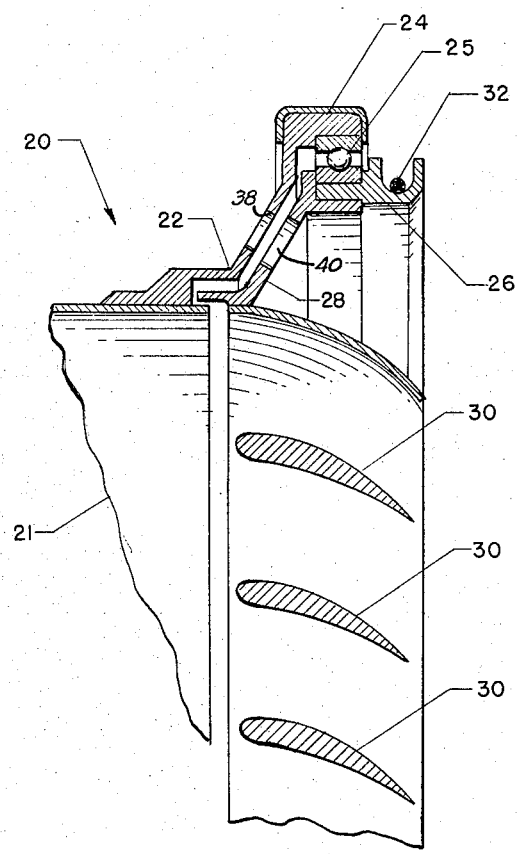
Fig. 4 is a fragmentary sectional view, on an enlarged scale, of a portion of the thrust diverter mechanism, taken from Figure 3.

Thus for example as illustrated in Figure 1, an airplane embodying the invention may be constructed to include a fuselage 10; empennage 12; and sustaining wing panels as indicated at 14. The aircraft power plant may comprise any preferred type jet or thrust engine, or pluralities thereof, as indicated at 15. In any case, the conventional thrust discharge nozzles of the power plant, as indicated in the drawing at 16, are centered in the plan view of the aircraft approximately beneath but slightly ahead of the overall center of gravity of the aircraft as indicated at 18 (Fig. 1). Thus, the thrust diverter mechanisms of the invention as indicated generally at 20 may be coupled to the basic engine thrust nozzles 16 so as to be adapted to divert the jet thrust forces downwardly, as will be explained more fully hereinafter, in vertical directions centered below the plan view location of the center of gravity 18 of the aircraft.

As illustrated in Figs. 2-4 the thrust diverter mechanisms may each include an elbow type conduit 21 fixed as by welding to extend generally rearwardly of the engine nozzle casing 16 (Figs. 2, 3) while pointing somewhat downwardly therefrom. An annular housing 22 is fixed as by welding to the conduit 21 to extend radially thereof into a rim formation 24 mounting an annular bearing device as indicated at 25 (Fig. 4). The inner race of the bearing 25 mounts an annular rim 26 and a flange 28 comprising an integral assembly carrying a plurality of parallel spaced vanes 30 disposed transversely of the rim 26. As shown in Fig. 4, the vanes 30 are of curved streamlined sectional configurations and are pitched relative to the rim 26 so as to divert the direction of gas flow through the vane assembly relative to the direction of its previous flow through the casing 21.

The vanes 30 are fixedly mounted within the rim 26, and thus it will be appreciated that the direction of diversion of engine thrust forces will depend upon the rotational position of the vane assembly relative to the mounting rim 24. For example, rotation of the vane assembly to the position illustrated by Fig. 2 will adjust the assembly to divert the thrust gases traveling through the casing 21 into a rearwardly directed or horizontal path; whereas rotation of the assembly to the position thereof shown in Fig. 3 will cause the latter to divert the engine thrust forces downwardly. Hence, when the vane assemblies are adjusted to the position shown in Fig. 2, the aircraft will be driven to fly in conventional forward flight; while when the assemblies are adjusted to the position of Figs. 3, 4, the aircraft will be maneuverable for vertical takeoffs and landings.

Figure 7:
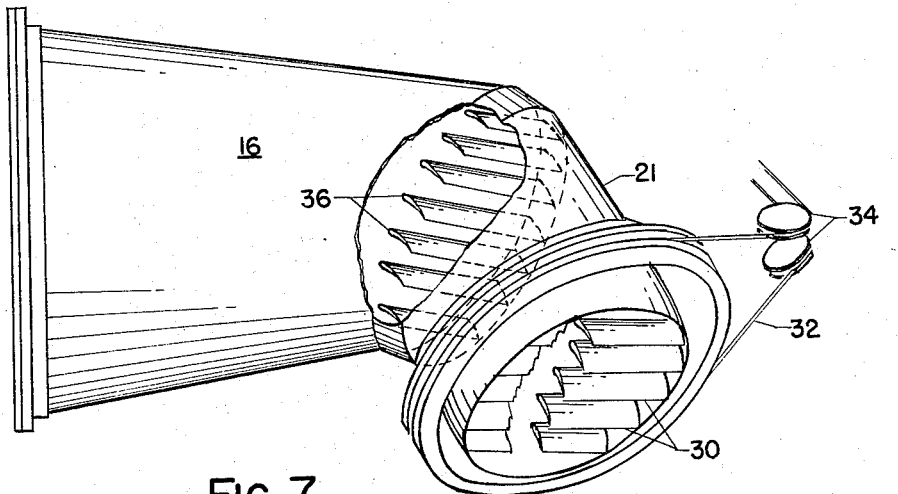
Figs. 7-8 are inboard side elevational views of one of the tail pipes and thrust diverter devices of Figs. 5-6, showing the thrust diverter mechanism in down and rear thrust positions respectively.
Figure 8:
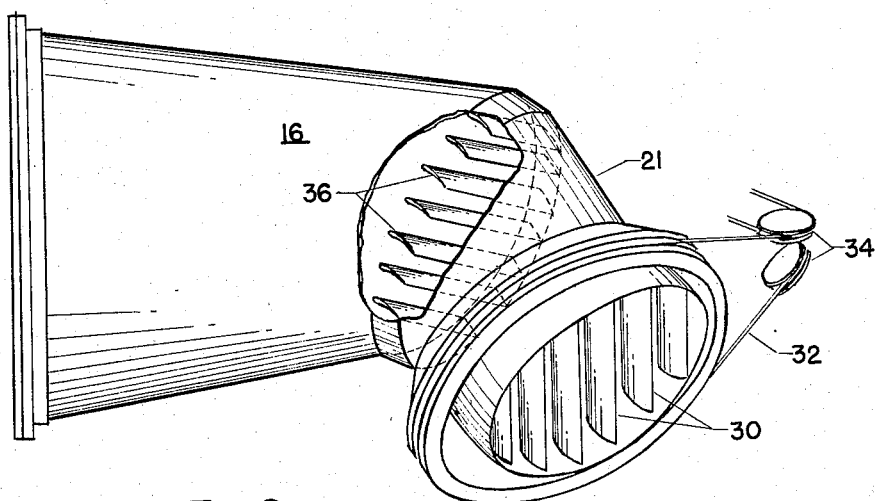

To control the position of the vane assemblies any suitable means may be employed to effect rotation thereof relative to the conduits 21. For example, the periphery of the rim 26 may be grooved to accommodate a driving cable 32, which as shown in Figs. 7-8 may be in the form of an endless power transmitting belt driven by a motor or other power source as guided by 34. Or, any suitable source of power may be otherwise geared to the rims 26 to cause them to rotate alternatively between horizontal and vertical thrust positions as explained hereinabove. Preferably, series of parallel gas flow guide vanes will be disposed as indicated at 36 at the junctures of the engine nozzles 16 and the diverter conduits 21 to provide smooth changes of direction of flow of the thrust gases into the conduits 21.

Figure 5:
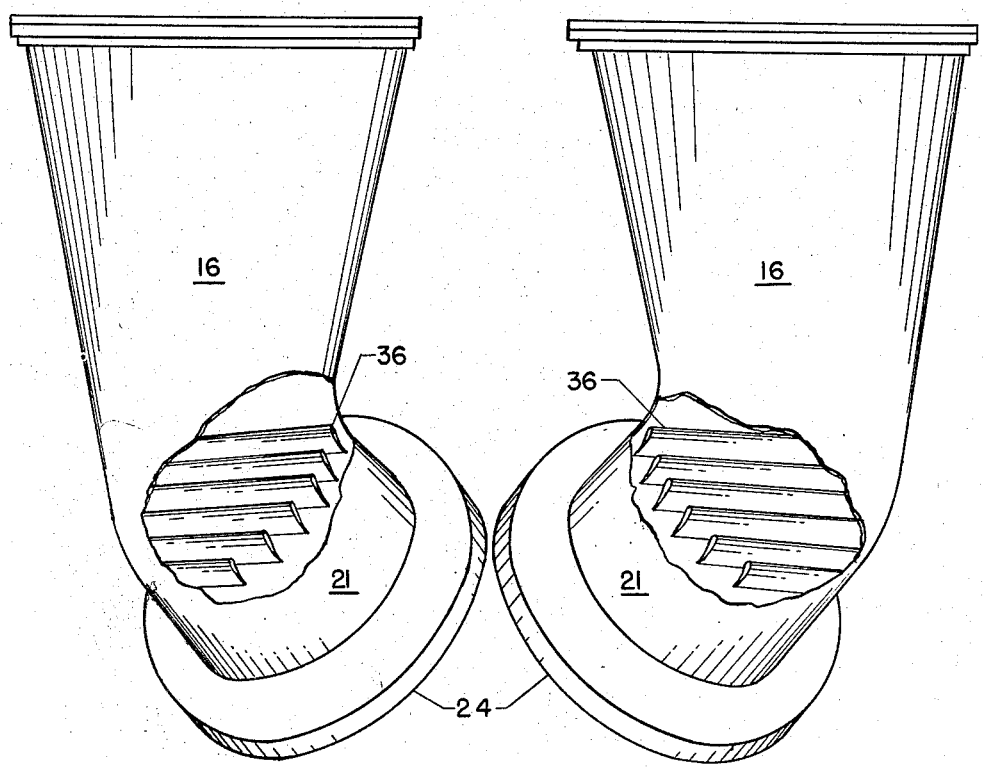
Fig. 5 is a fragmentary somewhat schematic plan view of a dual tail pipe power plant arrangement of the present invention.
Figure 6:
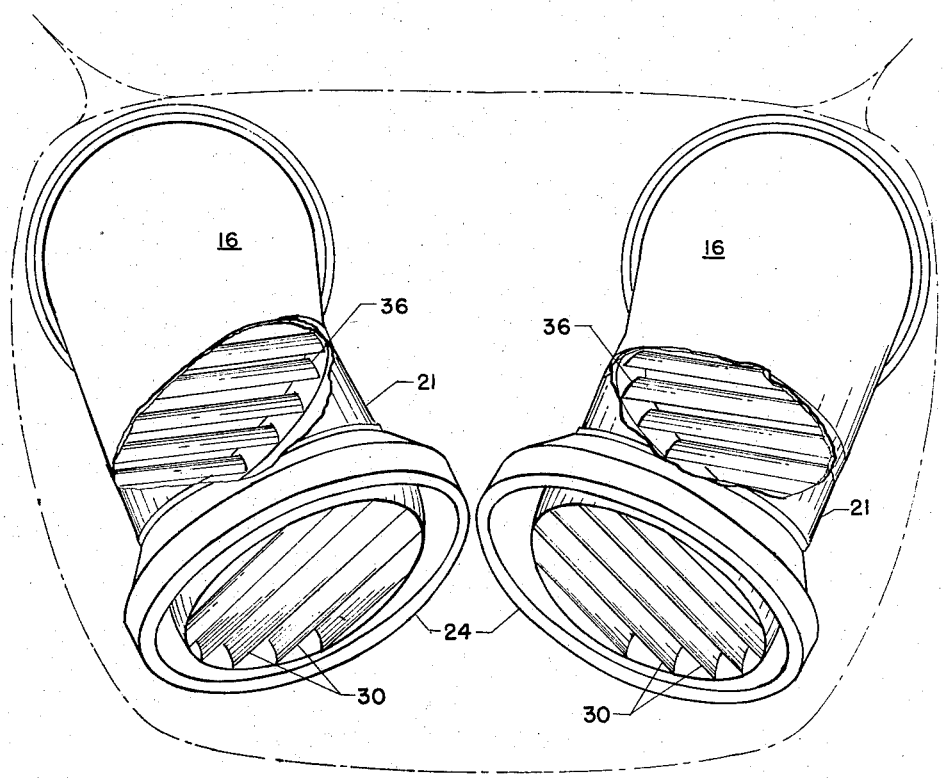
Fig. 6 is a rear end view of the mechanism of Fig. 5.

Figs. 5–6 show in plan and in rear end elevation respectively a dual engine arrangement of the present invention and the corresponding dual nozzle and thrust diverter installation. In such case the dual vane assemblies mount upon corresponding diverter conduits leading from corresponding tail pipes, and the entire arrangement is preferably centered both in the aircraft plan view and rear view relative to the axes of the aircraft; while the vane assemblies are arranged to direct their vertical blasts downwardly in paths directly below and as close as possible in line with the overall aircraft center of gravity. A single motor or drive pulley system may of course be arranged to simultaneously adjust both vane assemblies between horizontal and vertical discharge positions; or any other suitable pilot-controlled means may be employed in lieu thereof.

For optimum effect the thrust guide casings 21 and diverting vane assemblies 30 are disposed in "pigeon-toe" attitudes both in plan view and in the end elevational views, whereby a novel thrust directional control effect is attained.

For example, although for practical reasons the engines of the dual power plant arrangement must be somewhat separated and therefore disposed at a substantial distance apart in the airframe, by virtue of the arrangement of the present invention the thrust guard conduits and the thrust diversion control vane assemblies cooperate to ultimately bring the thrust vector centers into maximum side-by-side proximity, both under horizontal and vertical thrust operating conditions. Also, by virtue of the arrangement of the present invention transitory deflections of the thrust output vectors of the dual vane assemblies, incidental to conversion of the power plant from vertical to horizontal thrust conditions, are accompanied by minimum lateral digressions of the thrust vectors from the optimum vertical and horizontal projections thereof, and any such digressions are automatically balanced out by opposition of one to the other.

It is a feature of the present invention that the thrust diverter arrangement thereof permits the power plant to be partially nested within the frontal profile of the fuselage structure as conventionally designed while permitting the air intake ducts 36 of the engines to be unobstructed by requisite fuselage structure. At the same time the main body and rear end portions of the power plant nest appreciably into the conventionally provided mid-fuselage structure. The downward slopes of the diverter conduits 21 makes this arrangement feasible while at the same time providing the requisite thrust direction modification prior to engine discharge gas entry into the vane assembly components which thereupon redirect the thrust forces into alternatively vertical or horizontal paths.

It is another feature of the invention that the vanes 30, occupying space within the sectional profile of the thrust conduit and diverter mechanism, thereby function to "nozzle" the system and so provide the constricted "throat" effect well known to be requisite in such systems for optimum operating efficiency. It is another feature of the invention that the relatively short length diversion guide devices provide their vertical thrust vectors through the overall center of gravity position of the aircraft, albeit rotation of the diverter vane units effect no actual gas exit area changes. To effectively cool the bearing mechanism 25 series of holes as indicated at 38, 40 may be provided through the housing 22 and the flange 28, respectively (Fig. 4) at suitable intervals therearound; cool air flowing externally of the device being thereby directed to encompass the bearing structure.

Thus, this extremely simplified structural arrangement of the present invention provides for maximum efficiency in the overall aircraft design as well as optimum efficiency in utilization of the engine thrust forces for either vertical or horizontal maneuvering, combined with utmost facility of operation and control. Although only one specific form of the invention has been illustrated and described in detail hereinabove, it will be understood that various changes may be made therein without departing from the spirit of the invention or the scope of the following claims.

We claim:

1. A jet engine powered fixed wing type aircraft including a fuselage, jet engine means mounted upon said fuselage with its tail pipe directed rearwardly and substantially horizontally, stationary thrust directional change conduit means extending from said tail pipe and shaped to slant the direction of thrust gas flow therefrom, and engine thrust diverter means comprising means rotatably mounted upon said conduit means and carrying transverse vanes pitched to divert gas flow therethrough obliquely away from the axial alignment of said diverter means, whereby rotational adjustments of the latter will alternatively divert the engine thrust forces between vertically downward directions and generally horizontal directions, and means pilot-controllable to adjust said diverter means between the aforesaid rotational positions thereof.

2. A jet engine powered fixed wing type aircraft including a fuselage, a jet engine power plant mounted in said fuselage with the upper portion of the power plant tail pipe means disposed above the lower level of the rearwardly adjacent portion of the fuselage, said tail pipe means being directed rearwardly and toward the said adjacent portion of the fuselage, thrust directional change conduit means extending in fixed relation from said tail pipe means and shaped to change the direction of thrust gas flow to avoid said adjacent portion of the fuselage and to pass obliquely therebelow, said conduit means terminating in annular rim means disposed below said fuselage and canted obliquely thereto in the side view of the aircraft, and engine thrust diverter means comprising ring means rotatably mounted upon said rim means and carrying transversely thereof spaced apart deflector vanes fixed to said ring means and pitched to divert gas flow therethrough in direction obliquely from the axial alignment of said ring means whereby rotational position changes of the latter alternatively divert the engine thrust forces between vertically downward direction beneath the overall center of gravity of the aircraft and horizontal direction rearwardly and passing under the aft portion of the fuselage, and means pilot controlled to adjust said ring means between the aforesaid rotational positions thereof.

3. A jet engine powered fixed wing type aircraft including a fuselage, jet engine means mounted underneath said fuselage and partially nested upwardly therein with tail pipe means disposed above the lower level of the rearwardly adjacent portion of the fuselage, said tail pipe means being directed rearwardly and toward the said adjacent portion of the fuselage, thrust directional change conduit means extending in fixed relation from said tail pipe means and shaped to change the direction of thrust gas flow around said adjacent portion of the fuselage, said conduit means terminating in rim means, and engine thrust diverter means comprising ring means rotatably mounted upon said rim means and carrying deflector vanes pitched to divert direction of gas flowing therethrough whereby rotation of the latter will alternatively divert the engine thrust forces between vertically downward directions and horizontal directions passing under the fuselage, and means pilot-controlled to adjust said ring means between the aforesaid rotational positions thereof.

4. A jet engine powered aircraft including a fuselage, a jet engine mounted underneath said fuselage with the upper portion of the thrust discharge nozzle of the engine disposed above the lower level of the rearwardly adjacent portion of the fuselage, said discharge nozzle being directed rearwardly and toward said adjacent portion of the fuselage, a thrust directional change conduit extending in fixed relation from said discharge nozzle and shaped to change the direction of thrust gas flow to avoid said adjacent portion of the fuselage and to pass therebelow, and an engine thrust diverter comprising a member rotatably mounted upon the terminal portion of said conduit and carrying transversely thereof a plurality of spaced apart deflector louvres fixed to said member and pitched to divert gas flow therethrough whereby rotation of the latter will alternatively divert the engine thrust forces between vertically downward direction beneath the overall center of gravity of the aircraft and a horizontal direction passing under the fuselage, and means adapted for pilot control to adjust said member between the aforesaid rotational positions thereof.

5. A jet engine powered fixed wing type aircraft including a fuselage, jet engine means mounted upon said fuselage, stationary thrust directional change conduit means extending from said jet engine means and shaped to slant the direction of thrust gas flow relative to the thrust axis of the aircraft, and engine thrust diverter means rotatably mounted on said conduit means and carrying vane means pitched to divert the direction of gas flowing therethrough whereby rotation of the diverter means will alternatively divert the engine thrust forces between vertically downward directions and generally horizontal directions, and means pilot-controllable to adjust said diverter means between the aforesaid rotational positions thereof.

6. A jet engine powered aircraft including a fuselage, jet engine means mounted upon said fuselage and having tail pipe means directed rearwardly, thrust directional change conduit means extending from said tail pipe means and shaped to slant the direction of thrust gas flow downwardly and laterally, and engine thrust diverter means rotatably mounted upon said conduit means and carrying deflector vane means pitched to divert gas flow therethrough whereby rotation of the diverter means will alternatively divert the engine thrust forces between vertically downward directions and horizontal directions while providing optimum "orifice" effect at the trust exit, and means pilot-controllable to adjust said diverter means between various rotational positions thereof.

References Cited in the file of this patent

UNITED STATES PATENTS

| | | |
|---|---|---|
| 1,800,794 | Hartman | Apr. 14, 1931 |
| 2,774,554 | Ashwood | Dec. 18, 1956 |

FOREIGN PATENTS

| | | |
|---|---|---|
| 755,019 | Great Britain | Aug. 15, 1956 |
| 1,066,499 | France | Jan. 20, 1954 |